US011282500B2

(12) United States Patent
Griffin et al.

(10) Patent No.: US 11,282,500 B2
(45) Date of Patent: Mar. 22, 2022

(54) GENERATING AND TRAINING NEW WAKE WORDS

(71) Applicant: Cisco Technology, Inc., San Jose, CA (US)

(72) Inventors: Keith Griffin, Oranmore (IE); Dario Cazzani, Upland, CA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 228 days.

(21) Appl. No.: 16/517,314

(22) Filed: Jul. 19, 2019

(65) Prior Publication Data

US 2021/0020162 A1 Jan. 21, 2021

(51) Int. Cl.
*G10L 15/06* (2013.01)
*G10L 13/08* (2013.01)
*G10L 15/08* (2006.01)

(52) U.S. Cl.
CPC ............. *G10L 15/063* (2013.01); *G10L 13/08* (2013.01); *G10L 2015/088* (2013.01)

(58) Field of Classification Search
CPC ....... G10L 15/063; G10L 15/16; G10L 13/08; G10L 13/033; G10L 2015/088
See application file for complete search history.

(56) References Cited

U.S. PATENT DOCUMENTS

| | | | | |
|---|---|---|---|---|
| 8,719,039 B1* | 5/2014 | Sharifi | ..................... | G10L 15/08 704/275 |
| 9,368,105 B1* | 6/2016 | Freed | ....................... | G10L 15/22 |
| 9,484,014 B1* | 11/2016 | Kaszczuk | ............... | G10L 13/06 |
| 9,600,231 B1* | 3/2017 | Sun | ......................... | G10L 15/02 |
| 9,646,601 B1* | 5/2017 | Jedrzejczak | ............ | G10L 13/02 |
| 9,697,828 B1* | 7/2017 | Prasad | ..................... | G10L 15/08 |
| 10,002,613 B2 | 6/2018 | Rubin et al. | | |
| 10,170,116 B1* | 1/2019 | Kelly | ...................... | G06F 3/167 |
| 10,194,023 B1* | 1/2019 | Kong | .................... | H04M 1/573 |

(Continued)

FOREIGN PATENT DOCUMENTS

WO 2017217978 12/2017

OTHER PUBLICATIONS

Kumar, Rajath, et al., "On Convolutional LSTM Modeling for Joint Wake-Word Detection and Text Dependent Speaker Verification," Interspeech 2018, Sep. 2018, pp. 1121-1125.

*Primary Examiner* — Anne L Thomas-Homescu
(74) *Attorney, Agent, or Firm* — Polsinelli PC

(57) ABSTRACT

The disclosed technology relates to a process for automatically training a machine learning algorithm to recognize a custom wake word. By using different text-to-speech services, input providing a custom wake word to a text to speech service can be used in order to generate different speech samples covering different variations in how the custom wake word can be pronounced. These samples are automatically generated and are subsequently used to train the wake word detection algorithm that will be used by the computing device to recognize and detect when the custom wake word is uttered by any user nearby a computing device for the purposes of initiating a virtual assistant. In a further embodiment, "white-listed" words (e.g different words that are pronounced similar to the custom wake word) are also identified and trained in order to minimize the occurrence of erroneously initiating the virtual assistant.

20 Claims, 3 Drawing Sheets

(56) References Cited

U.S. PATENT DOCUMENTS

| | | | |
|---|---|---|---|
| 10,339,925 B1* | 7/2019 | Rastrow | H04L 67/306 |
| 10,448,115 B1* | 10/2019 | Jamal | H04N 21/42203 |
| 10,580,405 B1* | 3/2020 | Wang | G10L 17/22 |
| 10,762,896 B1* | 9/2020 | Yavagal | G10L 15/183 |
| 10,812,921 B1* | 10/2020 | Hinthorn | H04R 1/406 |
| 10,943,060 B2* | 3/2021 | Mertens | G06F 3/167 |
| 2008/0059191 A1* | 3/2008 | Huang | G10L 15/30 |
| | | | 704/260 |
| 2008/0059193 A1* | 3/2008 | Huang | G10L 15/00 |
| | | | 704/260 |
| 2008/0195391 A1* | 8/2008 | Marple | G10L 13/10 |
| | | | 704/260 |
| 2009/0048838 A1* | 2/2009 | Campbell | G10L 13/033 |
| | | | 704/254 |
| 2013/0191126 A1* | 7/2013 | Thambiratnam | G10L 15/187 |
| | | | 704/245 |
| 2014/0012586 A1* | 1/2014 | Rubin | G10L 15/06 |
| | | | 704/273 |
| 2014/0278413 A1* | 9/2014 | Pitschel | G10L 15/22 |
| | | | 704/243 |
| 2014/0334645 A1* | 11/2014 | Yun | G10L 15/22 |
| | | | 381/110 |
| 2014/0365216 A1* | 12/2014 | Gruber | G10L 15/063 |
| | | | 704/235 |
| 2016/0071510 A1* | 3/2016 | Li | G10L 13/027 |
| | | | 704/260 |
| 2016/0125877 A1* | 5/2016 | Foerster | G10L 17/10 |
| | | | 704/232 |
| 2016/0155437 A1* | 6/2016 | Kanevsky | G09B 5/04 |
| | | | 704/254 |
| 2017/0345411 A1* | 11/2017 | Raitio | G10L 13/0335 |
| 2018/0182390 A1* | 6/2018 | Hughes | G10L 15/02 |
| 2018/0233150 A1* | 8/2018 | Gruenstein | G10L 15/30 |
| 2018/0374477 A1* | 12/2018 | Kim | G10L 15/063 |
| 2019/0073997 A1* | 3/2019 | Millen | G06N 20/20 |
| 2019/0341067 A1* | 11/2019 | Rajendran | G10L 25/12 |
| 2020/0090643 A1* | 3/2020 | Shin | G10L 15/30 |
| 2020/0242299 A1* | 7/2020 | Ekmekci | G06F 40/279 |
| 2020/0357388 A1* | 11/2020 | Zhao | G06K 9/623 |
| 2020/0365138 A1* | 11/2020 | Kim | G10L 13/00 |
| 2020/0395008 A1* | 12/2020 | Cohen | G06F 40/205 |
| 2021/0104221 A1* | 4/2021 | Sharifi | G10L 13/086 |

* cited by examiner

GENERATING AND TRAINING NEW WAKE WORDS

TECHNICAL FIELD

The subject matter of this disclosure relates in general to the selection and recognition of wake words, and more specifically for the use of artificial intelligence technologies to provide data to improve recognition of wake words.

BACKGROUND

Virtual assistants (also referred to as intelligent personal assistants) are software agents that perform tasks or services for a user based on verbal commands. In order to activate a virtual assistant, the user would recite a wake word. The wake word is a pre-defined word (or phrase) that is uttered verbally by the user in order to indicate to the virtual assistant, being run on a computing device (e.g. smartphone) that the user would like to utilize the virtual assistant and intends to provide subsequent verbal commands associated with tasks or services to be performed.

There are a number of different existing computing devices that utilize virtual assistants in connection with computing devices. For example, Amazon has Alexa, Microsoft has Cortana, and Apple has Siri. These virtual assistants each have a pre-defined set of words or phrases that the associated computing device (via a microphone) will continually be listening for. These pre-defined set of words or phrases assigned as wake words for these computing devices are not generally customizable.

BRIEF DESCRIPTION OF THE FIGURES

In order to describe the manner in which the above-recited and other advantages and features of the disclosure can be obtained, a more particular description of the principles briefly described above will be rendered by reference to specific embodiments that are illustrated in the appended drawings. Understanding that these drawings depict only embodiments of the disclosure and are not therefore to be considered to be limiting of its scope, the principles herein are described and explained with additional specificity and detail through the use of the accompanying drawings in which.

BRIEF DESCRIPTION OF EXAMPLE EMBODIMENTS

Figure 1:
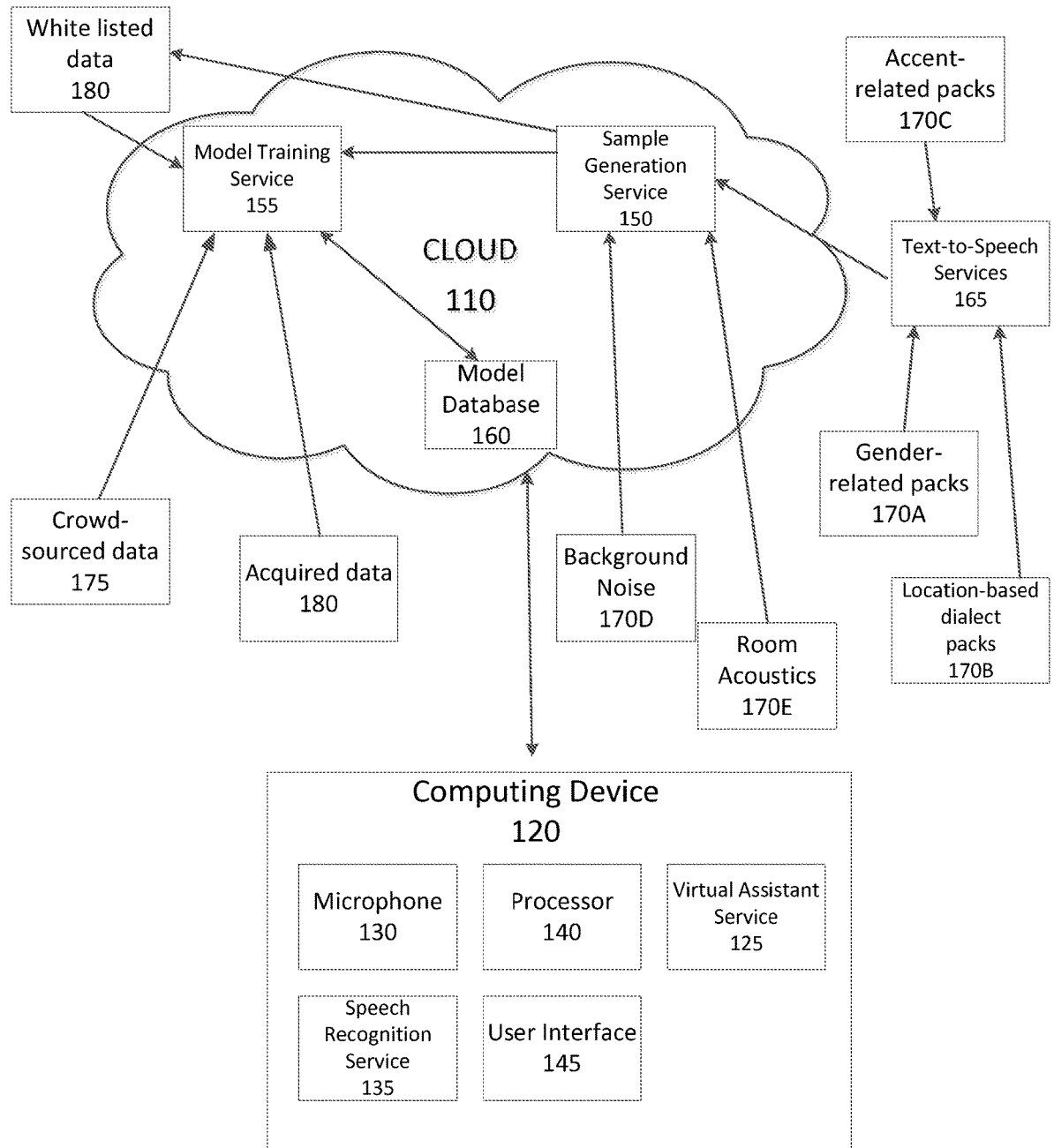
FIG. 1 is a conceptual block diagram illustrating an example network environment in accordance with various embodiments of the subject technology.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

OVERVIEW

Disclosed herein are computer-implemented methods, computer-readable media, and systems for generating and automatically training custom wake words. The generation and training of the custom wake words is first established based on receiving a user input from a user that corresponds to the custom wake word. The user input would include the one or more words that will be spoken by the user in a vicinity of a computing device in order to invoke a virtual assistant associated with the computing device. Once the custom wake word has been provided, samples are automatically generated using text-to-speech services. A machine learned model is trained in order to output an algorithm that is used to detect the custom wake word by using the generated samples. The algorithm can then be deployed to the computing device so that the computing device is able to recognize the wake word when spoken.

In a further embodiment, the various text-to-speech services that are used to generate the samples modify the user input in order to simulate how the wake word would be pronounced based on having different pitches, different accents, different geographical regions, different gender, and different speeds. In addition, the samples could also take into account modifying how the wake word is pronounced and detected by the computing device in different environments by simulating different types of background noise and/or room acoustics.

In a further embodiment, the computer-implemented methods, computer-readable media, and systems for generating and automatically training custom wake words would also identify one or more "white-listed" words that are similar to the custom wake word. However, these similar words should not be recognized as the actual custom wake word and should not be used to initiate the virtual assistant. The "white-listed" words can be trained similar to the custom wake word using generated samples and machine learning models so that the computing device is capable of also detecting the "white listed" words.

EXAMPLE EMBODIMENTS

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

As described herein, the present description provides details regarding how to generate and automatically train custom wake words used in connection with virtual assistants that are run on computing devices. Exemplary virtual assistants, such as Alexa, Cortana, and Siri (which are associated with Amazon, Microsoft, and Apple, respectively) are assigned a pre-defined set of words or phrases that users can recite that are captured (via a microphone), recognized (via speech-recognition related processing), and used to instruct the computing device that the virtual assistant should be activated. However, the pre-defined set of words or phrases are generally the only terms that are allowed to be utilized in this manner.

There are some existing processes that allow the creation of custom wake words. For example, Microsoft Azure allows for the creation of wake words using speech services. However, the custom wake word will generally be used only by that user. Since the training of the custom wake word would be specific to that user, training would be significantly simpler and require fewer samples than a system invoked by many different users. To have the custom wake work be applicable to a broad group of users, there are challenges with obtaining enough appropriate and diverse samples for the custom wake word within a period of time that can be used to train a wake word detection algorithm that would allow the computing device to detect and recognize the custom wake word when spoken by many different users. Samples would need to take into consideration a wide variety of different ways people can speak the custom wake words that include differences related to pronunciation, pitch, accents, regional dialects, and gender. The samples that are used would need to take in a varied distribution in order to minimize the possibility of bias so that the machine learned model can be used to identify the largest scope of people. However, the time and resources required to obtain the pre-requisite number and type of samples can be prohibitive. Especially in situations where the accuracy/quality of the custom wake word is important, a large number of samples (e.g. tens of thousands) may need to be gathered, characterized, and used in the training of the wake word detection algorithm.

Current methods of generating and training custom wake words require the collection of samples spoken by humans in order to train a wake word detection algorithm that can be provided to the speech recognition service 135. The trained wake word detection algorithm would be used to identify captured audio speech by the computing device 120 from the microphone 130) that would correspond to the custom wake word. In particular, the trained wake word detection algorithm would be used by the computing device 120 to filter all audio and only identify the wake word when spoken. This method is often time consuming, and reflects bias toward the population that provided the samples.

The present technology takes less time to create a wake word detection algorithm that will also perform better since it will be trained with a greater diversity of speech samples and therefore have less inherent bias.

FIG. 1 an example network environment 100 in accordance with various embodiments of the subject technology. Various embodiments are disclosed with respect to the example network environment 100. Specifically, the present disclosure addresses how a wake word detection algorithm is generated using machine learning models that are fed speech samples derived from text to speech services to generate many diverse speech samples including the wake word. Although the figure illustrates the use of the cloud 110 (separate from the computing device 120) in connection with the generating wake words and training of the machine learning models to recognize custom wake words, other arrangements are also possible. For example, in some embodiments some or all of the automatic training of models can be performed within the computing device 120.

Typically, a wake word is used in connection with the computing device 120 in order to invoke a virtual assistant (e.g. Alexa, Cortana, Siri). The virtual assistant (which is carried out via a virtual assistant service 125 or application associated with the computing device 120) may generally be a background operation until called upon to perform a task or service. A user of the computing device 120 can speak a wake word (e.g. "Alexa") which acts as a verbal command that is captured and recognized by the computing device 120. The wake word is then used as an indication that the user would like to invoke the virtual assistant. The computing device 120 may generally be monitoring nearby audio via an internal microphone 130.

Through the use of the speech recognition service 135 and processor 140, the computing device 120 can determine if any wake words were detected. The speech recognition service 135 would specifically be looking for wake words while disregarding other audio (e.g. everyday conversation in the background) that the microphone may pick up while monitoring for the wake word.

When the speech recognition service 135 detects the wake word for the virtual assistant, the processor 140 generates instructions for the virtual assistant service 125 to become active. Furthermore, the computing device 120 may be set to a particular state in order to receive the next words spoken by the user as these words would more than likely be associated with verbal commands that would be useful in instructing what services or tasks the virtual assistant would be requested to perform.

As described above, many existing virtual assistants utilize a pre-determined set of words or phrases as wake words. In order to use a new or custom wake word, it may be possible to receive a customized word or words (e.g. phrase) via a user interface 145. The customize wake word may be entered as text. Alternatively, the user interface 145 may initiate a recording function that would allow the user to record the user saying the custom wake word using the microphone 130.

A wake word detection algorithm is used to recognize the custom wake word when spoken in human speech. The wake word detection algorithm, in one embodiment, may be an algorithm by which a machine learning model can use and process the generated samples in order to identify a plurality of parameters that correspond to how the custom wake word can be pronounced inclusive of the variations present in the samples. With each of those parameters, weights can be assigned by the machine learning model in order to simulate how the custom wake word is pronounced in a different manner. The combination of the algorithm, parameters, and weights is something that would be obtained through many iterative cycles by the machine learning model using the generated samples in order to identify the different variations in pronouncing the custom wake word so that when the word is spoken, the algorithm is capable of recognizing the wake word. The parameters and how the weights are applied to the algorithm are established during training of the machine learning model using the generated samples. The machine learning model used in connection with the samples and modification of the associated algorithm used to detect the wake word and its variations would be complex. However, it may be possible to map the different ways custom wake words can be pronounced to parameters of a wake word detection algorithm associated with the machine learned model. In any case, the machine learning model is capable of learning (on a more efficient and expedient manner) what features and parameters to use in order to detect different pronunciations of the custom wake word.

Although it would be possible to train the machine learning model to take into account the differences that arise from, for example, pitch, accents, geographical/regional dialects, or gender as described above, there would be a need to collect enough live samples of different people saying the custom wake word so that the training can be performed and account for the differences. Fewer samples collected generally yields a wake word detection algorithm that is less accurate.

Another consideration about the machine learning models would also be that there would need to be enough variation and diversity between the samples so that the machine learning model would be able to learn a wide variety of different ways people can say the same custom wake word. The collection of a wide variety and diverse number of samples from different real-life people would require a lot of time and resources which would make user customization of wake words impractical or at the very least time-consuming.

However, the present technology pertains to an improved method of automatically training the machine learning models to recognize custom wake words. In particular, a user would be able to receive a custom wake word via the user interface 145 of the computing device 120. In order to better allow the speech recognition service 135 to detect when the custom wake word is spoken by different users nearby the computing device 120 (or other computing devices), training can be performed on a machine learning model associated with the custom wake word in the cloud 110. Further details pertaining to the training of the machine learning models via the cloud 110 are provided below.

In connection with FIG. 1, the cloud 110 may have various elements that would facilitate in the training of machine learning models used in connection with custom wake words. The sample generation service 150 provides the cloud 110 the capabilities to automate generation of samples connected to the custom wake word. The samples would correspond to different variations in how the custom wake word would be recited by different users. These different variations would be generated using different algorithms that utilize various parameters and weights that may be programmed to correspond to different ways words can be pronounced by different users.

The model training service 155 would use the samples generated by the sample generation service 150 to perform training for a model associated with the custom wake word. The machine learning model is used to create a wake word detection algorithm that can be provided to the speech recognition service 135 so that the computing device 120 would be capable of detecting when the custom wake word has been uttered by a user. The model database 160 would be used to store the models (both current and past versions).

One of the benefits of the subject technology is provided with the sample generation service 150 that allows for the automated generation of samples. The samples correspond to different variations in the way the custom wake word could be pronounced. The samples would be used by the model training service 155 in order to generate (and update) a wake word detection algorithm that would facilitate identifying situations when captured audio detects the custom wake word while distinguishing from situations when the custom wake word was not spoken. Rather than acquiring each of the samples from actual individuals by having them speak the custom wake word, recording the speech, and processing the samples via the cloud 110, the sample generation service 150 will generate some (or all) of the samples used in the training of the machine learning model.

The sample generation service 150 facilitates in the automated training of models associated with the custom wake word by automatically generating the samples that will be used with that training. In some embodiments, the sample generation service 150 receives the custom wake word from the computing device 120. The custom wake word may be a text input that has been received from the computing device 120 by the sample generation service 150. In either case, the sample generation service 150 will process the custom wake word into a compatible format and begin generating samples based on the custom wake word.

Generally, the processed custom wake word will be modified in any number of different ways in order to generate variations of how the custom wake word may be pronounced by different users. For example, the custom wake word provided by the user computing device 120 may have its pitch or speed adjusted. Such modifications can correspond to different ways other users may pronounce the custom wake word. The modifications may be implemented via algorithms that have a variety of parameters or weights that simulate different ways the custom wake word can be pronounced.

In particular, the algorithm may have a plurality of different parameters that modify how the custom wake word can be pronounced (e.g. pitch, speed, tone). A plurality of weights associated with each of those parameters would adjust the parameters in order to create the different variations in pronunciation for the custom wake word.

The sample generation service 150 may also utilize different text-to-speech services 165. The text-to-speech services 165 may be found on the Internet. The text-to-speech services 165 provide the sample generation service 150 the information used to generate a different variation of how to pronounce the custom wake word from a text version. Since there are a variety of different versions of text-to-speech that cover different variations on how to pronounce the custom wake word, for example, based on gender 170A, regional/geographic dialect 170B, and accents 170C, the sample generation service 150 can utilize these related text-to-speech services 165 to automate generation of samples.

For example, the same word in English can be pronounced differently based on whether the text-to-speech service 165 is associated with the United States dialect, British dialect, Australian dialect, Irish dialect, and Scandanavian dialect. Even within the United States, there may be variations based on regions such as south (e.g. Texas), west (e.g. California), and Northeast (e.g. New York). The text-to-speech service 165 can then use corresponding language packs that would include various algorithms, parameters, and weights to modify the received custom wake word from the computing device 120 in order to simulate how the custom wake word would be pronounced in different regional dialects.

As illustrated in the figure, there may be different text-to speech related packs 170A-170C that are specific to a particular element such as regional/geographic dialect 170B, gender 170A, and accents 170C. Other packs may also be available to provide other types of modification to how the wake word is recited by users (e.g. speed, pitch). The sample generation service 150 can use a variety of different text-to-speech services 165 and a variety of different packs 170A-170C in order to generate a varied number of samples that would provide for an even distribution/variety thereby minimizing bias. Bias would correspond to situations where a disproportionate number of samples that all share a similar characteristic (e.g. regional dialect) are relied on for training a model but that characteristic is not common to other ways the wake word is pronounced. As an example, having half of the samples pertain to how British people say the custom wake word would bias the detection of the custom wake word to be more well-tuned to British users while other users who may not be British may experience inconsistent wake word detection when they speak the wake word.

In addition, other embodiments may have the sample generation service 150 utilize different services and/or algorithms developed to simulate, for example, background noise 170D or room acoustics 170E. These different services and/or algorithms could be applied in addition to the above text-to-speech related packs in order to simulate how the wake word could sound like if spoken by an individual who is farther away from the computing device 120. Wake words may sound different if a user speaks the wake word in a crowded room, in a different room, in a room that echoes, etc. The different services and/or algorithms that simulate background noise 170D or room acoustics 170E could provide further samples that help the machine learning model better detect the wake word in different environments.

One of the benefits of the automated generation of the samples via the sample generation service 150 is that the service 150 can be configured to generate samples using a variety of different methodologies in order to provide a diverse variety of different samples. As described above, there may be any number of different elements that can influence how a word or words are pronounced by a single (or multiple different) users. For example, differences in pitch, gender, regional/geographic dialect, and accents can influence how a word or words are recited by a user. There may be other elements that could also produce variations/influence how the pronunciation of a word is provided that would also be emulated via the sample generation service 150.

To ensure that a diverse variety of samples are used, a pre-determined number of samples can be associated with each different way/element that influences a variation of how the custom wake word can be pronounced. This ensures that a wide range of different variations are used and that bias relating to one or more elements would be minimized.

Once the samples have been automatically generated using the sample generation service 150, the samples can be provided to the model training service 155. The model training service 155 uses machine learning techniques to analyze various samples including the spoken custom wake work in order to generate a wake word detection algorithm for that custom wake word. An exemplary wake word detection algorithm is defined by an algorithm with various parameters tuned to recognize identifiable attributes of the spoken custom wake word when spoken in speech of various pitches, genders, tempo, dialects, accents, etc. The wake word detection algorithm is generated based on the generated samples from the sample generation service 150. The wake word detection algorithm, once generated, can also be updated over time as additional samples (e.g. newer samples) are obtained, processed, and used to train the wake word detection algorithm.

Furthermore, the wake word detection algorithm can also be trained using crowd-sourced data 175 (e.g audio data obtained by other users and stored on a server or in the cloud) or user acquired data 180 (e.g. actual voice samples of individuals reciting the custom wake word). In some embodiments, crowd-sourced data 175 and user acquired data 180 may be part of the data set used to train a wake word detection algorithm.

In different embodiments, there may be a pre-determined number of samples that would need to be used in order adequately generate a wake word detection algorithm that would allow the computing device to recognize the customized wake word having a pre-determined accuracy. In some cases, the user may have access to a number of samples less than the pre-determined number of samples that are associated with crowd-sourced data 175 and/or user acquired data 180. Thus, the present invention provides the additional samples that can be used for training the wake word detection algorithm by automatically generating these samples that can then be used to satisfy the pre-determined number of samples.

Furthermore, the sample generation service 150 can be used to generate additional samples in order to provide a variety/diversity of samples. After analyzing what type of samples are currently available, there may be instructions that are generated for the sample generation service 150 that would instruct the generation of additional samples corresponding to other elements (e.g. dialect, accents) that are not covered (or minimally covered) in the previously existing samples. As described above, other conditions that may be helpful in generating samples could be tied to background noise and/or room acoustics. Samples based on background noise and/or room acoustics could simulate people speaking the wake word in different environments (e.g. crowded room, in another room, in a large room that echoes).

The model training service 155 can perform the training of the wake word detection algorithm using any of several known techniques adapted for this purpose. For example, speech samples could be vectorized and all vectors that are similar enough to vectors known to represent the spoken wake work can be considered to include the spoken wake work. In another example, a neural network can be used to decompose a spoken phrase while a classifier can determine if the decomposed spoken phrase includes the spoken wake word. Details about these two different processes covered in different embodiments of the present technology are provided below. It should be noted that other processes may currently also exist and be similarly applicable to the present situation.

In vectorization the different samples used to train the wake word detection algorithm can be converted into a vector situated in a multi-dimensional space. The custom wake word and samples can be processed and represented as a vector in a multi-dimensional space where each dimension may correspond to a different aspect of speech. Different samples will have different vectors within the same multi-dimensional space based on differences in the way the custom wake word is pronounced. A threshold difference can be used to identify which vectors similar enough to correspond to the vector corresponding to the custom wake word.

Using a neural network, the speech can be analyzed to identify important aspects of the speech and to represent these aspects of the speech. This data can be feed to a classifier that is trained to receive the representations and determine how likely it is that the representation includes the spoken wake word. The neural network and classifier can be trained by providing feedback on successful identifications and false identifications so that the neural network can become better tuned at identifying important aspects of the speech, and the classifier can be trained to become better at correctly classifying the representations from the neural network as including the wake word or not.

The generated wake word detection algorithm can then be stored in the model database 160. The model database 160 can provide the wake word detection algorithm for a particular custom wake word to other computing devices (e.g. via download from the cloud) in situations where other users would like to implement that custom wake word in connection with their virtual assistant.

To create an even more robust wake word detection algorithm, in additional to generating samples of variations pertaining to the custom wake word, the present technology may also generate other words that are pronounced or at least sound similar to the custom wake word (e.g. white-listed data 180). In generating these other words by the sample generation service 150, the model training service 155 can use these other words in order to associate a corresponding label that will be used to prevent (e.g. white list) these other words from causing the erroneous initiation of the virtual assistant. In addition, model training service 155 can also use the white listed data during training in order to differentiate these other words represented in the white listed data as distinct from the designated wake word. The resulting wake word detection algorithm should not confuse the white listed data as the wake word used to initiate the virtual assistant.

Figure 2:
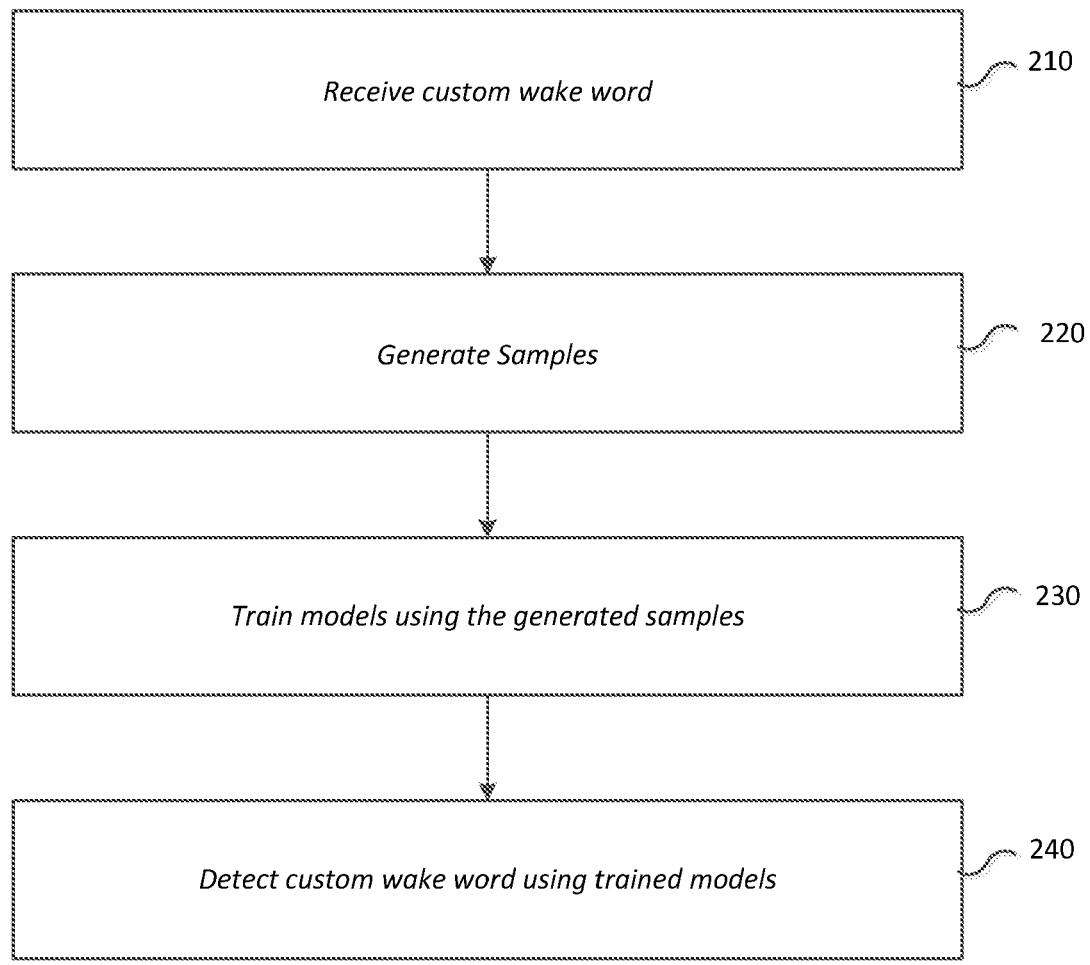
FIG. 2 shows an example process for generating and training a model associated with a new wake word.

FIG. 2 shows an example process 200 for training a machine learning algorithm and generating a wake word detection algorithm to detect a new customized wake word. As described above, a customized wake word can be generated and wake word detection algorithm can be automatically created using machine learning without the need for users to obtain actual audio samples of people pronouncing the word or words corresponding with the custom wake word. The samples used for the training of the machine learning algorithm used to create the wake word detection algorithm to detect when the wake word is spoken is based on various modifications that simulate variations in how the wake word can be recited by different users. Furthermore, the generation of the samples can be configured to provide a varied and diverse selection so as to minimize bias.

In step 210, a user may provide a custom wake word. The wake word would generally be input into a computing device as text via an interface. In some embodiments, a user could also provide an audio recording of the user reciting the custom wake word. However, the audio recording of the user saying the wake word would then be converted into text so that modifications to the wake word can be performed (via step 220) in order to generate the samples used to train a machine learning model to create a wake word detection algorithm associated with the custom wake word.

In step 220, the present invention automatically generates samples related to the custom wake word. Based on the custom wake word, samples can be automatically generated using, for example, text-to-speech services, that would modify the custom wake word in order to generate different variations of the custom wake word that would correspond to different ways others may pronounce the wake word. The text-to-speech services may modify the custom wake word based on, for example, accent or location-based dialect.

Aside from text-to-speech services, different algorithms can also be used to modify the wake word. The algorithms may have different parameters and weights that can be used to adjust how the wake word is pronounced (e.g. speed, pitch). The modifications to the parameters and weights could be used to simulate how different users may pronounce the wake word (e.g accents, dialect).

In step 230, a machine learning model can be automatically trained (and updated) based on the generated samples. By using the generated samples, the machine learning model can be used to learn how to identify the custom wake word and its many different variations on how the wake word may be pronounced by different individuals.

Based on the number of samples that are generated (in step 220) and used in training the machine learning model, a degree of accuracy can be expected when using the machine learning model to identify the custom wake word when it is spoken by nearby users. As more samples are used in training the machine learning model, the degree of accuracy increases compared to when a lesser number of samples are used.

Furthermore, the training of the machine learning model may take into account not only the generated samples from step 220 of the custom wake word but also samples of the custom wake word uttered by different users. These "live" samples may be obtained from actual users (e.g, crowd-sourced data). The generated samples (from step 220) may be used to supplement the training of machine learning models when there are not sufficient number of "live" samples.

In addition, the training of the machine learning model to recognize the custom wake word can also incorporate training to identify "white-listed" words that are similar to but are not the custom wake word. As described above, "white-listed" words are words that may be spelled or may sound/be pronounced similar to the custom wake word. The training of the machine learning model to recognize the "white-listed" words may also be carried out in order to identify these words and recognize that these words should not be used to initiate the virtual assistant.

In step 240, the wake word detection algorithm that was the result of training of the machine learning model can be provided to user computing devices in order to detect when the custom wake word has been spoken by nearby users. The computing device may continually be monitoring audio from nearby users and evaluate the audio with the wake word detection algorithm for the custom wake word.

The present technology can be used in a single instance to develop a wake word detection algorithm to detect the use of a custom wake word, or can be deployed as a service to multiple users. When the present technology is utilized as a service to generate wake word detection algorithms for multiple users each desiring a wake word detection algorithm to detect their own respective custom wake word, some aspects of the technology can become even more robust. For example, when using a machine learning model to develop the wake word detection algorithm, the neural network can become optimized for analyzed speech segments. Only the classifier would need to be trained for each new wake word. In the example of vectorizing speech samples and determining their proximity to know examples of the wake word, the vectorization mechanism could also be reusable for characterizing different wake words as vectors to determine if they are similar (proximate) to a vector representing the spoken wake word.

Figure 3:
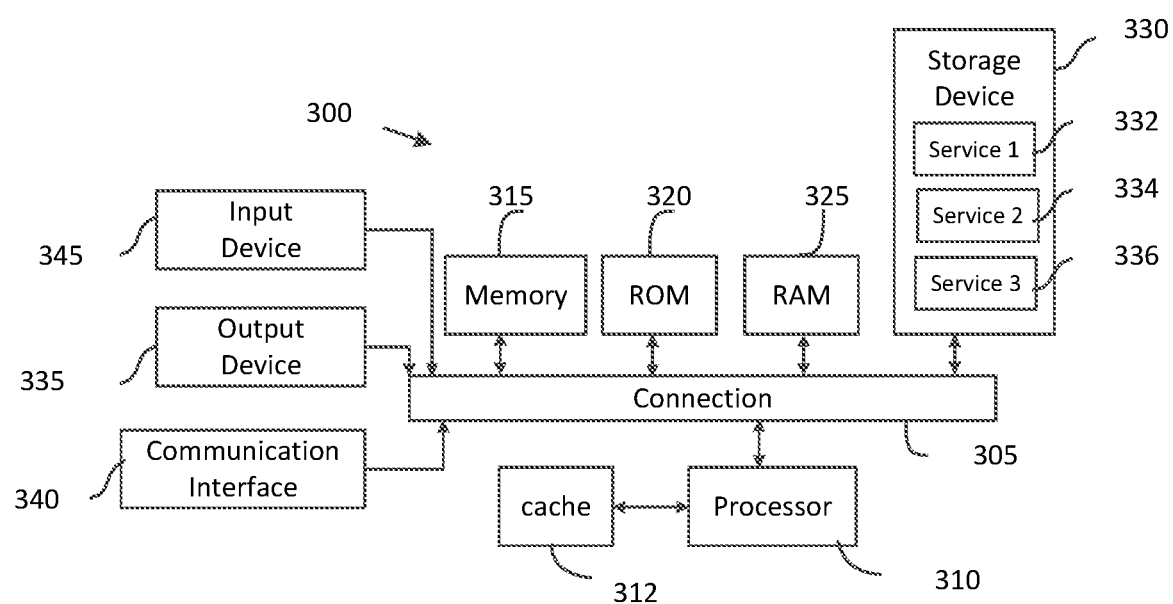
FIG. 3 shows an example computing system in accordance with various embodiments of the subject technology.

FIG. 3 shows an example computing system 300, which can be for example any computing device making up the computing devices illustrated in FIG. 1 or any component thereof in which the components of the system are in communication with each other using connection 305. Connection 305 can be a physical connection via a bus, or a direct connection into processor 310, such as in a chipset architecture. Connection 305 can also be a virtual connection, networked connection, or logical connection.

In some embodiments computing system 300 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 300 includes at least one processing unit (CPU or processor) 310 and connection 305 that couples various system components including system memory 315, such as read only memory (ROM) 320 and random access memory (RAM) 325 to processor 310. Computing system 300 can include a cache of high-speed memory 312 connected directly with, in close proximity to, or integrated as part of processor 310.

Processor 310 can include any general purpose processor and a hardware service or software service, such as services 332, 334, and 336 stored in storage device 330, configured to control processor 310 as well as a special-purpose processor where software instructions are incorporated into the actual processor design. Processor 310 may essentially be a completely self-contained computing system, containing multiple cores or processors, a bus, memory controller, cache, etc. A multi-core processor may be symmetric or asymmetric.

To enable user interaction, computing system 300 includes an input device 345, which can represent any number of input mechanisms, such as a microphone for speech, a touch-sensitive screen for gesture or graphical input, keyboard, mouse, motion input, speech, etc. Computing system 300 can also include output device 335, which can be one or more of a number of output mechanisms known to those of skill in the art. In some instances, multimodal systems can enable a user to provide multiple types of input/output to communicate with computing system 300. Computing system 300 can include communications interface 340, which can generally govern and manage the user input and system output. There is no restriction on operating on any particular hardware arrangement and therefore the basic features here may easily be substituted for improved hardware or firmware arrangements as they are developed.

Storage device 330 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 330 can include software services, servers, services, etc., that when the code that defines such software is executed by the processor 310, it causes the system to perform a function. In some embodiments, a hardware service that performs a particular function can include the software component stored in a computer-readable medium in connection with the necessary hardware components, such as processor 310, connection 305, output device 335, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method for automatically creating a wake word detection algorithm, the method comprising:
receiving a custom wake word, wherein the custom wake word includes one or more words that will be spoken in a vicinity of a computing device to invoke a virtual assistant associated with the computing device and the custom wake word has not yet been configured to invoke the virtual assistant;
generating a plurality of samples associated with the custom wake word, wherein the plurality of samples are generated using one or more text-to-speech services, each sample corresponding to a different variation to pronounce the custom wake word;

training a machine learning model for the custom wake word using the plurality of samples, wherein the machine learning model identifies and assigns weights to a plurality of parameters from the plurality of samples which correspond to how the custom wake word is pronounced in different manners inclusive of the different variation to pronounce the custom wake word; and deploying a wake word detection algorithm that is the result of the machine learning model for the custom wake word to the computing device, wherein the wake word detection algorithm facilitates the computing device in recognizing when the custom wake word when spoken by the user.

2. The method of claim 1, wherein the one or more text-to-speech services generate samples that modify how the user input would be spoken based on different pitches.

3. The method of claim 1, wherein the one or more text-to-speech services generate samples that modify how the user input would be spoken based on different accents.

4. The method of claim 1, wherein the one or more text-to-speech services generate samples that modify how the user input would be spoken based on different geographical regions.

5. The method of claim 1, wherein the one or more text-to-speech services generate samples that modify how the user input would be spoken based on the gender of the user.

6. The method of claim 1, wherein the one or more text-to-speech services generate samples that modify how the user input would be spoken based on different speeds.

7. The method of claim 1, generating the plurality of samples also uses services and/or algorithms that simulate background noise.

8. The method of claim 1, generating the plurality of samples also uses services and/or algorithms that simulate room acoustics.

9. The method of claim 1, further comprising:
identifying one or more "white-listed" words, wherein the "white-listed" words do not initiate the virtual assistant associated with the computing device, and wherein the "white-listed" words are similar to the custom wake word, and
training the machine learning model associated with the one or more "white-listed" words, whereby the wake word detection algorithm can recognize the one or more "white-listed" words as different from the wake word when spoken by the user within the vicinity of the computing device.

10. The method of claim 1, wherein the generating the plurality of samples using the one or more text-to-speech services comprises:
modifying how the custom wake word can be pronounced; and
varying at least one parameter of at least one of the one or more plurality of text-to-speech services to result in different variations in pronunciation for the custom wake word output by the at least one of the one or more text-to-speech services.

11. The method of claim 1 further comprising defining an even distribution of different types of samples used to train the machine learning model, wherein the even distribution minimizes a bias for the wake word detection algorithm.

12. The method of claim 1 further comprising receiving crowd-sourced samples of the custom wake word spoken from one or more individuals and supplementing the training of the machine learning model with the crowd-sourced samples.

13. A non-transitory computer-readable medium comprising instructions generating and automatically training a custom wake word, the instructions, when executed by a computing system, cause the computing system to:
receive a custom wake word, wherein the custom wake word includes one or more words that will be spoken in a vicinity of a computing device, to initiate a virtual assistant associated with the computing device and the custom wake word has not yet been configured to invoke the virtual assistant;
generate a plurality of samples associated with the user input, wherein the plurality of samples are generated using one or more text-to-speech services, each sample corresponding to a different variation to pronounce the custom wake word;
train a wake word detection algorithm for the custom wake word using the plurality of samples, wherein the machine learning model identifies and assigns weights to a plurality of parameters from the plurality of samples which correspond to how the custom wake word is pronounced in different manners inclusive of the different variation to pronounce the custom wake word; and
deploy the wake word detection algorithm for the custom wake word to the computing device, wherein the wake word detection algorithm facilitates the computing device in recognizing when the custom wake word when spoken by the user.

14. The non-transitory computer-readable medium of claim 13, wherein the one or more text-to-speech services modify the user input in order to create the variations in pronouncing the custom wake word.

15. The non-transitory computer-readable medium of claim 13, wherein the training of the wake word detection algorithm is performed using a neural network, and a classifier is used to classify speech samples as containing the wake word or not.

16. The non-transitory computer-readable medium of claim 13, wherein the instructions further cause the computing system to:
identify one or more "white-listed" words, wherein the "white-listed" words do not initiate the virtual assistant associated with the computing device, and wherein the "white-listed" words are similar to the custom wake word, and
train the machine learning model associated with the one or more "white-listed" words, whereby the wake word detection algorithm can recognize the one or more "white-listed" words as different from the wake word when spoken by the user within the vicinity of the computing device.

17. A system for generating and automatically training a custom wake word, the system comprising:
a processor; and
a non-transitory computer-readable medium storing instructions that, when executed by the system, cause the system to:
receive a custom wake word, wherein the customer wake word includes one or more words that will be spoken in a vicinity of a computing device, to initiate a virtual assistant associated with the computing device and the custom wake word has not yet been configured to invoke the virtual assistant, generate a plurality of samples associated with the user input, wherein the plurality of samples are generated using one or more text-to-speech services, each sample corresponding to a different variation to pronounce the custom wake word, train a wake word detection algorithm for the custom wake word using the plurality of samples, wherein the machine learning model identifies and assigns weights to a plurality of parameters from the plurality of samples which correspond to how the custom wake word is pronounced in different manners inclusive of the different variation to pronounce the custom wake word, and deploy the wake word detection algorithm for the custom wake word to the computing device, wherein the wake word detection algorithm facilitates the computing device in recognizing when the custom wake word when spoken by the user.

18. The system of claim 17, wherein the one or more text-to-speech services modify the user input in order to create the variations in pronouncing the custom wake word.

19. The system of claim 17, wherein the training of the wake word detection algorithm is performed using a neural network, and a classifier is used to classify speech samples as containing the wake word or not.

20. The system of claim 17, wherein the instructions further cause the system to:

identify one or more "white-listed" words, wherein the "white-listed" words do not initiate the virtual assistant associated with the computing device, and wherein the "white-listed" words are similar to the custom wake word, and train the machine learning model associated with the one or more "white-listed" words, whereby the wake word detection algorithm can recognize the one or more "white-listed" words as different from the wake word when spoken by the user within the vicinity of the computing device.

* * * * *